UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING CAOUTCHOUC-LIKE SUBSTANCES.

1,070,259.  Specification of Letters Patent.  Patented Aug. 12, 1913.

No Drawing. Original applications filed August 24, 1910, Serial Nos. 578,607 and 578,608. Divided and this application filed February 21, 1912. Serial No. 679,081.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Processes of Producing Caoutchouc-Like Substances, of which the following is a specification.

This invention relates to a process of producing caoutchouc-like substances from hydrocarbons of the erythrene series, such as isoprene and erythrene, by a process of polymerization.

This application is a division of our prior applications Serial Numbers 578,607 and 578,608, filed August 24, 1910.

We have found that by our novel method of polymerization hydrocarbons of the erythrene series such as erythrene itself,

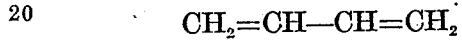

and isoprene or beta-methyl-erythrene,

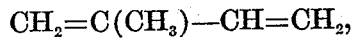

which hydrocarbons contain the characteristic nucleus of the erythrene series, graphically represented C=C—C=C, can be converted into caoutchouc-like substances in an efficient manner, and that the caoutchouc-like substances thus obtained possess many of the valuable properties of natural caoutchouc.

The new process for producing the caoutchouc-like substances consists in heating under caoutchouc-forming conditions the hydrocarbon of the erythrene series, such as erythrene or isoprene, in an isolated and substantially pure condition, alone, or without material addition thereto of reagents such as acids, bases or diluents until a caoutchouc-like product results insoluble in acetone and alcohol but soluble in benzene. The heating is advantageously carried on in a confined space, or under pressure as in an autoclave. The hydrocarbon thus heated is polymerized, and converted in part or in whole into polymerization products, giving an efficient yield of the caoutchouc-like polymerization product, together with more or less by-products, such as terpenes. The liquid may be stirred during the reaction to promote homogeneity. After the reaction has been carried to the desired stage or to completion the caoutchouc-like substance formed is separated from any accompanying by-products, as hereinafter described.

The present invention is of general application and is further illustrated and exemplified by the following specific examples of its application.

Example A: 200 parts of erythrene are liquefied by cooling, *e. g.*, with a mixture of ether and solid or liquid carbonic acid. The resulting liquid is then heated in an autoclave for four days at from 90 to 100° C. Unchanged erythrene is removed and the residue is heated for some time *in vacuo* on the water bath, the temperature of which is finally brought to boiling. On distillation a liquid distils over, while the caoutchouc-like product remains behind.

Example B: 100 parts of erythrene are heated in an autoclave for some time, *e. g.*, 3 months in an incubator to about 35° C. The caoutchouc substance is isolated as above described.

Example C: Isoprene is heated in an autoclave for 3 weeks at about 70° C. A jelly-like mass is thus obtained, which is heated on the water bath *in vacuo* and is then heated *in vacuo* in an oil bath at 130° C. The caoutchouc substance is then shaken with 10 times its quantity of ether for 24 hours. The ether is poured off and the residue is heated to 30-40° C. *in vacuo*.

The caoutchouc-like substances resulting from the process of the present invention are white substances insoluble in acetone and alcohol but soluble in benzene, which form ozonids, nitrosites and brom-addition products, which are capable of being vulcanized and which form valuable substitutes for natural caoutchouc.

Our method of polymerization may also be applied to mixtures of erythrene or isoprene and other hydrocarbons of the erythrene series and of similar groups in various proportions, to form caoutchouc-like substances.

We claim:

1. The process of producing a caoutchouc like substance which comprises polymerizing isoprene by heating alone under caoutchouc forming conditions until a caoutchouc-like product results insoluble in acetone and alcohol but soluble in benzene.

2. The process of producing a caoutchouc-like substance which comprises polymerizing isoprene by heating alone under pressure under caoutchouc forming conditions until a caoutchouc-like product results insoluble in acetone and alcohol but soluble in benzene.

3. The process of producing a caoutchouc like substance which comprises polymerizing isoprene by heating alone in a confined space under caoutchouc forming conditions until a caoutchouc-like product results insoluble in acetone and alcohol but soluble in benzene.

4. The process of producing a caoutchouc-like substance which comprises polymerizing isoprene by heating alone under caoutchouc-forming conditions until a caoutchouc-like product results insoluble in acetone and alcohol but soluble in benzene, and isolating the caoutchouc like substance from the resulting product.

5. The process of producing a caoutchouc like substance which comprises polymerizing isoprene by heating alone under caoutchouc-forming conditions until a caoutchouc-like product results insoluble in acetone and alcohol but soluble in benezene, and removing volatile constituents from the resulting product by distillation.

6. The process of producing a caoutchouc-like substance which comprises polymerizing isoprene by heating alone under caoutchouc-forming conditions until a caoutchouc-like product results insoluble in acetone and alcohol but soluble in benzene, and removing volatile constituents from the resulting product by distillation *in vacuo*.

7. The process of producing a caoutchouc like substance which comprises polymerizing a hydrocarbon of the erythrene series by heating alone under caoutchouc forming conditions until a caoutchouc-like product results insoluble in acetone and alcohol but soluble in benzene.

8. The process of producing a caoutchouc-like substance which comprises polymerizing a hydrocarbon of the erythrene series by heating alone under pressure under caoutchouc forming conditions until a caoutchouc-like product results insoluble in acetone and alcohol but soluble in benzene.

9. The process of producing a caoutchouc-like substance which comprises polymerizing a hydrocarbon of the erythrene series by heating alone in a confined space under cauotchouc forming conditions until a caoutchouc-like product results insoluble in acetone and alcohol but soluble in benzene.

In testimony whereof we have hereunto set our hands in the presence of two subscribing witnesses.

FRITZ HOFMANN. [L. S.]
CARL COUTELLE. [L. S.]

Witnesses:
HELEN NUFER,
ALBERT NUFER.